United States Patent [19]
Kerry et al.

[11] Patent Number: 5,434,944
[45] Date of Patent: Jul. 18, 1995

[54] OPTICAL FIBRE CONNECTION EQUIPMENT

[75] Inventors: John Kerry; Peter D. Jenkins; Nicholas J. Medlen; Paul F. Wettengel, all of Suffolk, England

[73] Assignee: British Telecommunications public limited company, London, England

[21] Appl. No.: 167,910
[22] PCT Filed: Jun. 18, 1992
[86] PCT No.: PCT/GB92/01096
§ 371 Date: Dec. 20, 1993
§ 102(e) Date: Dec. 20, 1993
[87] PCT Pub. No.: WO92/22842
PCT Pub. Date: Dec. 23, 1992

[30] Foreign Application Priority Data
Jun. 18, 1991 [GB] United Kingdom ............ 9113169
Oct. 31, 1991 [GB] United Kingdom ............ 9123129

[51] Int. Cl.$^6$ ................................ G02B 6/36
[52] U.S. Cl. ................... 385/135; 385/134; 385/136
[58] Field of Search ............... 385/135–137, 385/134, 109; 379/329; 439/310, 131

[56] References Cited

U.S. PATENT DOCUMENTS

| | | | |
|---|---|---|---|
| 4,712,106 | 10/1979 | Lewis | 385/109 X |
| 4,900,123 | 2/1990 | Barlow et al. | 385/135 |
| 4,911,662 | 3/1990 | Debortoli et al. | 439/719 |
| 4,986,762 | 1/1991 | Keith | 385/76 X |
| 5,067,784 | 11/1991 | Debortoli et al. | 385/135 X |
| 5,071,220 | 12/1991 | Ruello et al. | 385/135 |
| 5,109,467 | 4/1992 | Hogan et al. | 385/135 |
| 5,138,684 | 8/1992 | Bullock et al. | 385/103 X |
| 5,341,451 | 8/1994 | Latte et al. | 385/135 |

FOREIGN PATENT DOCUMENTS

| | | |
|---|---|---|
| 0293183 | 11/1988 | European Pat. Off. |
| 0341027 | 11/1989 | European Pat. Off. |
| 0356942 | 3/1990 | European Pat. Off. |
| 0490609 | 6/1992 | European Pat. Off. |

Primary Examiner—Rodney B. Bovernick
Assistant Examiner—Hemang Sanghavi
Attorney, Agent, or Firm—Nixon & Vanderhye

[57] ABSTRACT

An optical fiber connection terminal for use in the office or domestic environment includes a three-part module, having a base unit, an organizer unit and a top unit. An optical fiber cable, such as a blown fiber cable, is brought to the base unit where both the outer covering and the secondary coated optical fibers carried by the cable are secured against tensile forces. The three units of the module are then designed to store fiber, to hold splice protectors where necessary, and to provide a well protected route for the fibers from the cable to an easily accessible connection point for customer use in the top unit of the module. Connection or termination of each fiber at the connection point can be made and remade, drawing spare fiber length from a storage area in the module without disassembling the module. An important part of the module lies in a cam action clamping mechanism for retaining fiber within the module. The module provides an optical fiber connection terminal (which is equivalent in size to a conventional electrical supply terminal) for connection of domestic or office equipment to an optical communications network.

27 Claims, 12 Drawing Sheets

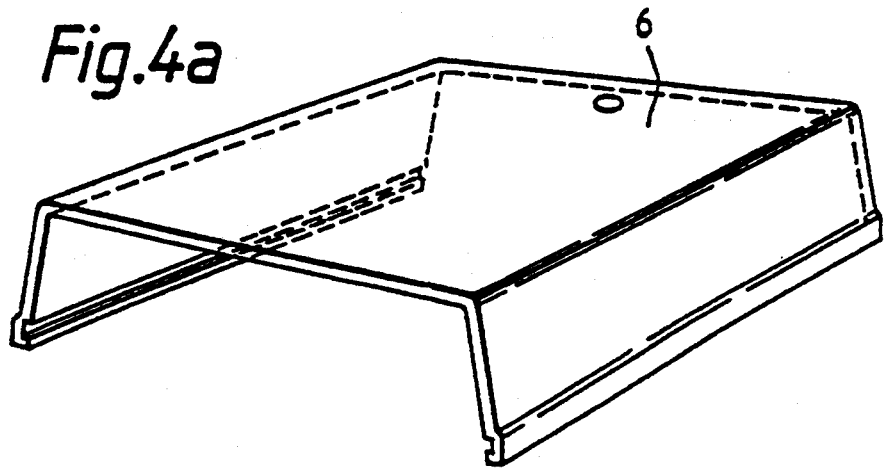
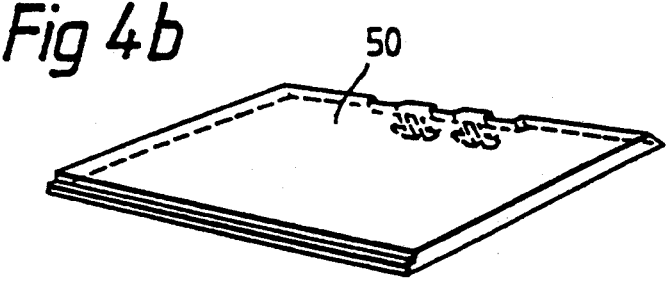
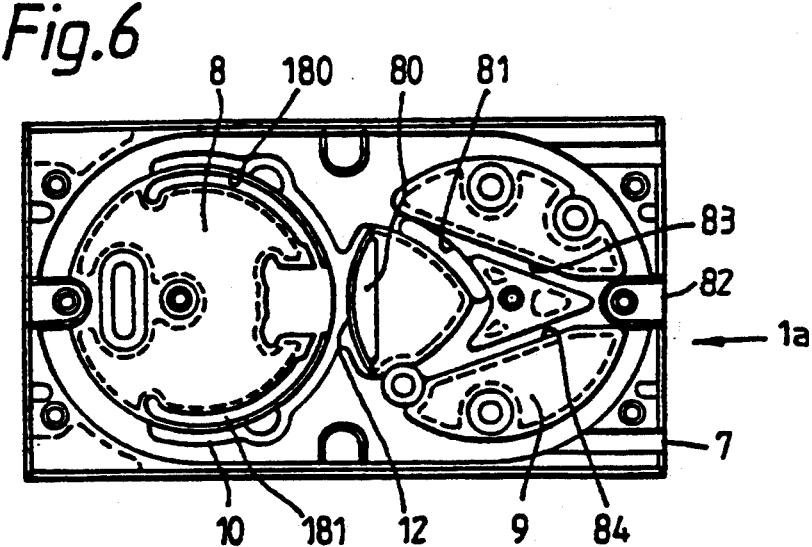

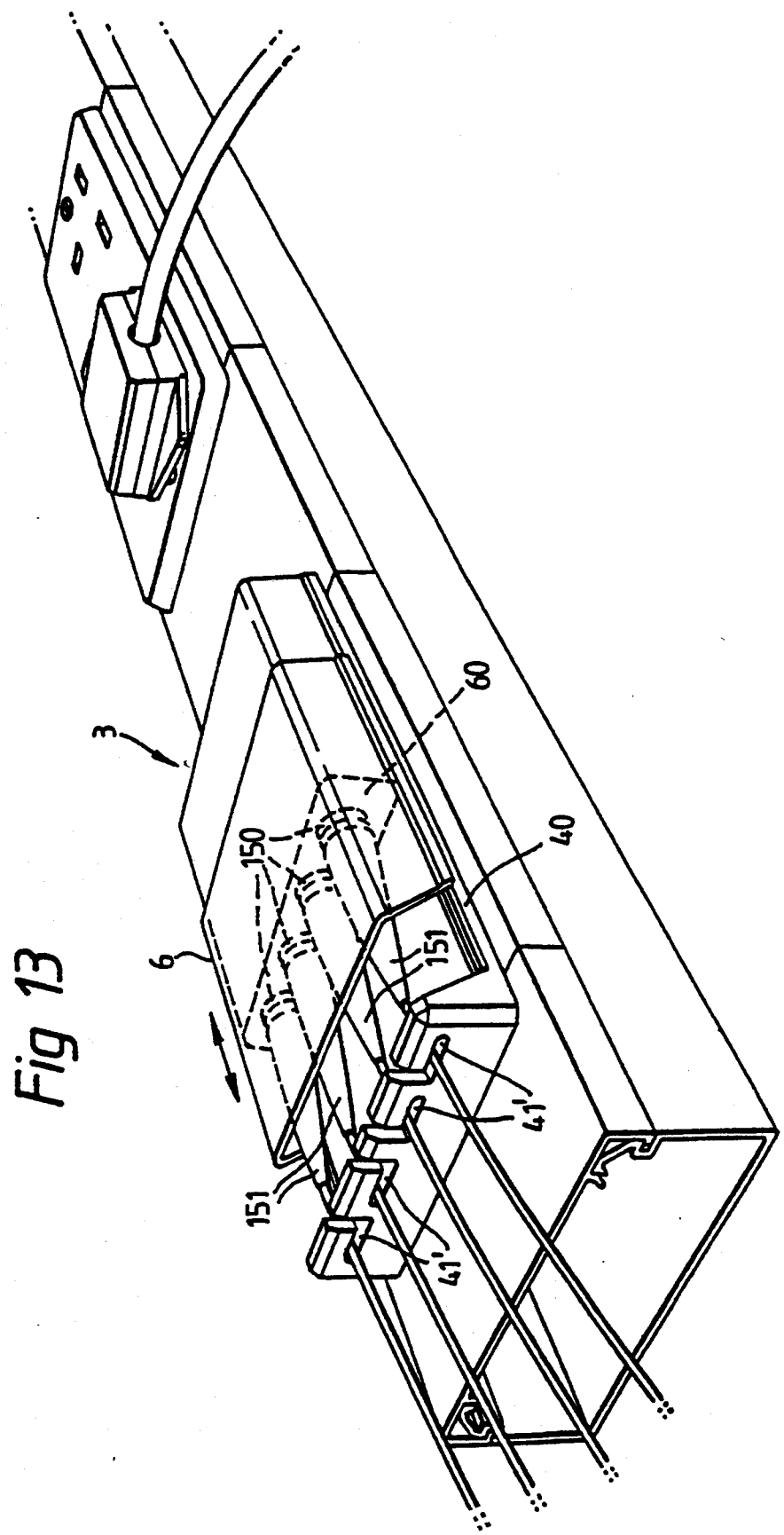

OPTICAL FIBRE CONNECTION EQUIPMENT

BACKGROUND OF THE INVENTION

1. Field of the Invention

This invention relates to optical fiber connection equipment, and in particular to termination or connection modules for in-building use.

2. Related Art

Optical fibers are known for use in telecommunications systems, for instance for carrying voice or data. Currently, however, there are many situations in telecommunications networks where optical fibers are connected to other forms of carrier such as copper wires. This can occur, for instance, in an office environment, optical fibers being used in the external telephone network and being brought into a building as far as a riser, the connection to desk equipment however being by copper wires.

The conversion of signals from optical signals to another form, such as electrical signals which might be carried by copper wires, has more than one disadvantage associated with it. Thus, the equipment required to carry out the conversion itself means added expense in a communication network. Moreover, the advantages of an optical fiber communications network, such as high data levels, can be lost if the signals then have to be transferred to another form of carrier. There can also be power or signal losses created in the network by the conversion stage, which losses then have to be compensated or allowed for.

Although single solutions for particular situations have been found, these tend to be dedicated solutions. There are many design constraints associated with optical fibers, such as minimum bend radius, which cannot necessarily be met in all situations by the solution to one particular set of circumstances. The number of factors which can be involved in designing termination equipment for optical fibers is large, including the following features:

1. Minimum bend radius
2. Minimum length of "spare" fiber for re-termination.
3. Holding of fiber to support a vertical drop weight where brought to termination equipment via a riser.
4. Maximum termination module size for use in various situations.
5. Different access requirements to termination modules for use in different situations, such as front access for rack termination use and top access for floor boxes.
6. Provision for fiber splice location.
7. Maximum number of bends limited by maximum loss requirements for termination module.
8. Different types of fiber storage necessary, such as fiber bundle, primary coated and secondary coated fiber.
9. Facilities for connection to different forms of connector which might already be in situ.
10. Safety requirements, for instance in connection with carrying coherent beam signals.
11. Variable entry requirements to termination modules for conduit, fiber and cable, determined primarily by mounting position and environment.

SUMMARY OF THE INVENTION

It has now been found possible to provide optical fiber connection equipment which meets at least some of the above requirements and constraints, and additionally can have the advantages of simplicity in use, suitability for single or multi-mode fiber connection, allowance for field termination or field splicing of factory made tails, and great versatility with respect to applications. For instance, connection equipment according to embodiments of the present invention can be used with blown fiber, as a modular build concept which makes the equipment easy to deal with, and can be us ed in floor boxes, wall boxes, trunking, patch panel and rack options. An embodiment can suit any of all or substantially all common connector types including multi-fiber connectors, can be used with single or multi-mode fiber, and can still meet the commonly applied criterion of maximum optical termination loss of 0.5 dB at 1300 nm and 850 nm.

The present invention provides optical fiber connection equipment comprising a modular unit into which a protected optical fiber carrier can be brought, so that optical fibers carried thereby can be terminated for subsequent connection to optical equipment, the unit comprising first, second and third separable modules, the second module being adjacent to the first module, and the third module being adjacent to the second module, the third module housing at least one optical connector at which a respective optical fiber of the carrier can be terminated, storage means for storing a length of optical fiber, and anchoring means for anchoring the optical fiber at first and second anchorage points which lie in different modules, the storage means being such that the length of optical fiber stored enables the modules to be separated without disconnection of the optical fiber at either of the anchorage points.

The stored length of fiber might most importantly be for remaking splices or connections to the fiber, but may also be to allow separation of the compartments so that each can be manipulated independently of the other. More than one length of fiber might be stored, so that these purposes can be provided for separately, storage means being provided for instance in each of the two separable compartments.

Such a unit may provide all the features 1 to 11 listed above, yet still have dimensions comparable to a conventional electrical twin socket installation, this making it particularly convenient to install in office or domestic environments.

An optical fiber carrier will in general comprise an outer covering within which a plurality of protectively coated fibers are carried. For instance, a known cable for installation by blowing might carry four fibers each having a thin, coloured acrylate primary coating, this making individual fibers more visible and being at least slightly protected for handling, the four fibers being carried together in a shared secondary coating of foamed plastics material, giving substantially more protection for handling. There is then a thick outer sheath. Another known form of optical fiber cable carries fibers which each have both a primary coating and a secondary coating.

In a preferred embodiment, the first module provides access for the carrier, the carrier comprising a plurality of primary coated optical fibers, a secondary coating surrounding the primary coated fibers, and an outer protective covering surrounding the secondary coating.

Alternatively, the carrier comprises a plurality of optical fibers each having a primary coating and a secondary coating, and an outer protective covering surrounding the optical fibers. In either case, the first anchorage point is located within the first module, the second anchorage point being located in the second module, and the outer protective covering being anchored at the first anchorage point. Where the carrier has a single secondary coating, the outer protective covering of the carrier is removed downstream of the first anchorage point, and the secondary coated fiber is anchored at the second anchorage point. Alternatively, where each fiber has both primary and secondary coatings, the outer protective covering of the carrier is removed downstream of the first anchorage point, a tubular sheath is positioned over the optical fibers, the tubular sheath constituting a secondary coating for said optical fibers, and the resulting secondary coated fiber is anchored at the second anchorage point.

Advantageously, the storage means is located within the first module, the storage means storing a length of secondary coated fiber downstream of the first anchorage point. The storage capacity in the first module can store a length of fiber to allow separation of the first and second modules, for installation or maintenance purposes for instance.

Preferably, the second module comprises first and second back-to-back compartments, the second anchorage point being located in the first compartment, the first compartment being adjacent to the first module. Conveniently, the first compartment of the second module is provided with further storage means for storing optical fiber. The storage capacity in the first compartment of the second module can store a length of fiber to allow remaking of terminations or splices on the fiber, this being a procedure which normally shortens available fiber. However, this further storage means can also allow separation of compartments of the unit.

The secondary coating may be removed downstream of the second anchorage point, and the second module may be formed with aperture means through which the primary coated fibers can pass from the first compartment to the second compartment. Advantageously, the equipment further comprises guidance means for guiding each primary coated fiber from the first compartment to the second compartment. Preferably, a respective flexible tube made of low friction material constitutes the guidance means of each primary coated fiber. The low friction material may be polytetrafluoroethylene.

Advantageously, the equipment further comprises additional storage means for storing a further length of optical fiber to facilitate making and re-making of a termination thereto, the additional storage means being such that optical fiber may be withdrawn therefrom without changing the number of bends in the fiber. Preferably, the additional storage means is located within the second compartment of the second module, the additional storage means storing loops of fiber in such a manner that an optical connection can be made between the free end of an optical fiber of the carrier and a respective optical connector housed in the third module, and such that said optical connection can be subsequently re-made following the removal of a portion of said optical fiber and the repositioning of said optical fiber so that its new free end can be connected to said optical connector without changing the number of loops of said optical fiber stored by the additional storage means. Conveniently, the additional storage means stores loops of primary coated fiber, there being provided a respective low friction guidance means for guiding each primary coated fiber from the additional storage means to the or each optical connector. Each said guidance means may comprise a flexible tube of low friction material such as polytetrafluoroethylene.

The equipment may further comprise a third anchorage point, the third anchorage point being located in the first module and being adapted to anchor the secondary coated optical fiber.

Advantageously, the third anchorage point comprises a rotatable member of non-circular cross-section mounted adjacent to a movable member, such that rotation of the rotatable member from a rest position acts on the movable member to move it outwards with respect to the rotatable member, the movable member being provided with a resilient surface and being brought into co-operation, as a result of said outward movement, with a support member so as to anchor the secondary coated optical fiber lying between the resilient surface and the support member, in use, against axial tension.

The use of a resilient surface, such as a neoprene or rubber coating, also acts to relieve stress which might otherwise be generated in a fiber being clamped.

It is known that there are alternative methods for terminating fibers, particularly field termination or the use of a spliced factory. "tail". Another facility the modular unit might provide is holding means for splices, or splice protectors, in assication with storage capacity for fiber length for making and remaking splices.

The combination of the primary coated fiber storage facility, and the provision of the low friction tubes for protecting the fibers means that an engineer in the field working on the termination can simply pull through extra fiber from the storage area without having to access the interior of the modular unit. Thus, there is reduced risk to the primary coated fiber during field modification to the termination, for maintenance or replacement purposes for instance.

To co-operate with this type of arrangement, it is very advantageous if the storage technique used for the primary coated fiber should allow fiber to be extracted therefrom by simple pulling without changing the number of loops of fiber stored and therefore the optical losses introduced by the modular unit. To achieve this, the primary coated fiber may be stored in loops, each of which at least approximates to an ellipse, so that pulling on an end of a fiber merely shortens straight sections of the fiber, so that the bends involved are brought closer together but are not changed in radius or number.

Embodiments of the present invention can provide an effectively controlled environment for optical fibers being brought from a communications network environment to an office environment, while allowing access for connection and re-connection of the fibers in that office environment. The connection equipment may be provided as one of two sets of connection equipment at either end of an optical fiber in-building link from the general communications network, the link then having known or predictable losses as a result of the fiber bends and/or terminations introduced.

By exploiting the present invention, a very well protected but versatile and convenient unit can be provided for use in installing in-building fiber connections without introducing unacceptable or unpredictable losses.

The invention also provides retaining means for optical fiber which may be subject to axial tension, the retaining means comprising a rotatable member of non-circular cross-section mounted adjacent to a movable member, such that rotation of the rotatable member from a rest position acts on the movable member to move it outwards with respect to the rotatable member, the movable member being provided with a resilient surface and being brought into co-operation, as a result of said outward movement, with a support; member so as to retain an optical fiber lying between the resilient surface and the support member, in use, against axial tension.

BRIEF DESCRIPTION OF THE DRAWINGS

Embodiments of the present invention will now be described, by way of example only, with reference to the accompanying drawings, in which:

FIGS. 4a and 4b are perspective views of a sliding cover and a lid respectively for use in the modular unit of FIG. 1;

FIG. 6 is a plan view of the base unit of FIG. 2;

FIG. 13 shows a modular unit installed on trunking, ready for use;

DETAILED DESCRIPTION OF EXEMPLARY EMBODIMENTS

Figure 1:
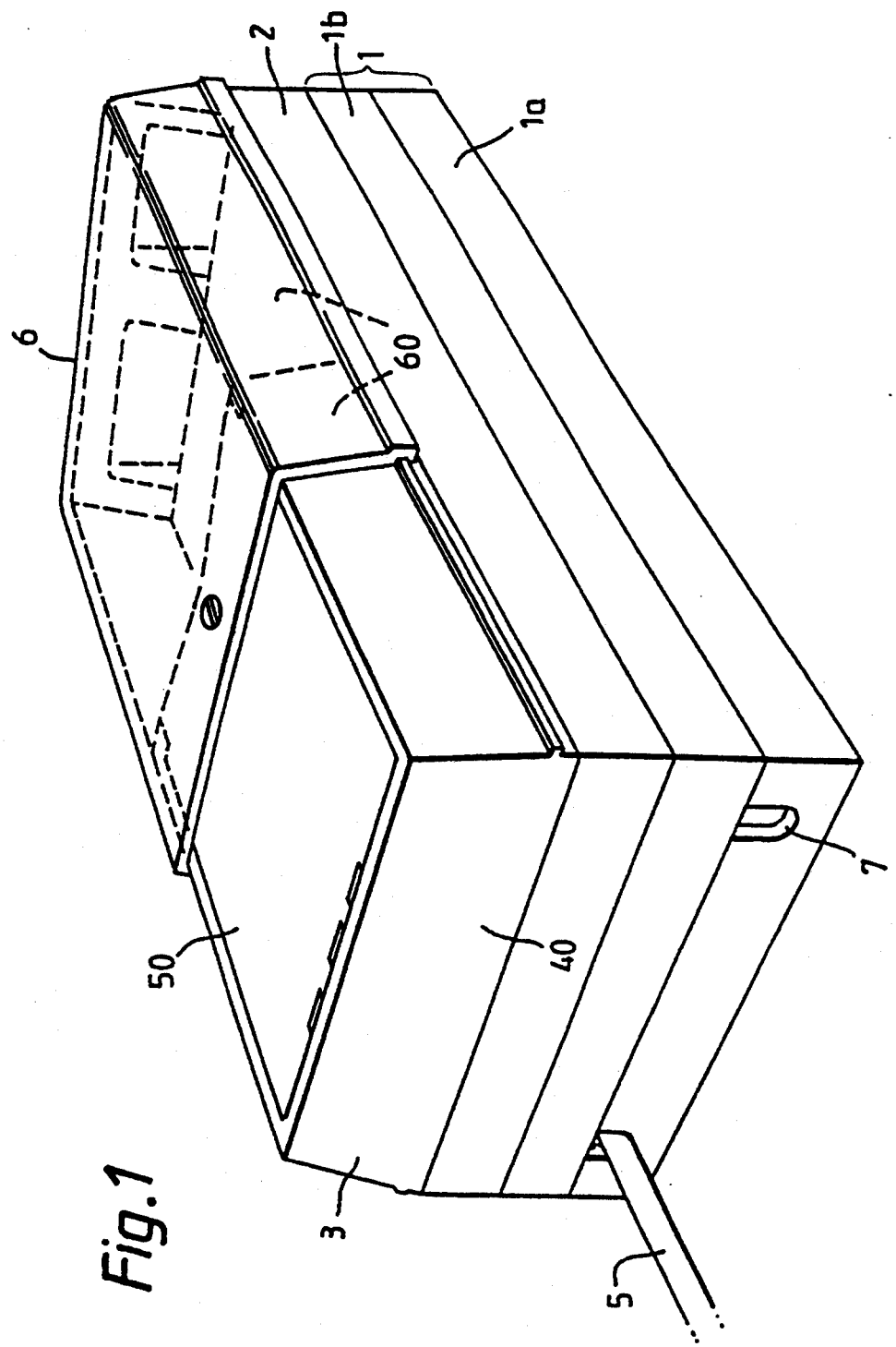
FIG. 1 is a perspective view of a modular unit according to an embodiment of the present invention, for mounting on a wall or in a floor box.

Referring to the drawings, FIG. 1 shows a modular unit comprising a base unit 1, a fiber organiser unit 2 and a top unit 3. The base unit 1 has lower and upper parts 1a and 1b respectively, these together making up the full-height base unit, but being separable in that the upper part 1b of the base unit can be removed to leave the lower part (half-height base unit) 1a.

The modular unit is adapted to receive a blown fiber cable 5, to the individual fibers of which customer connections can be made within the top unit 3, visible through a transparent sliding cover 6. The cable 5 has four primary coated fibers housed within a single secondary coating which is protected by an outer tube.

Overall, the modular unit has dimensions equivalent to those of a conventional electrical double socket.

The functions of the various parts of the modular unit are arranged so that the incoming cable 5 is dealt with as follows:

1. The incoming cable 5 is brought up to the half-height base unit 1a.

2. Inside the half-height base unit 1a, the secondary coated fiber is exposed from the outer tube of the cable 5, and the end of the cable 5 and the secondary coated fiber are clamped separately in the half-height base unit.

3. A length of the secondary coated fiber is stored in loops in the upper part 1b of the base unit 1, the free end of the secondary coated fiber then being guided to the fiber organiser unit 2 where it is again clamped.

4. A length of each of the primary coated fibers, which have been exposed by stripping the secondary coating from the end of the fiber, is stored in the lower part of the fiber organiser unit 2, the free ends of the primary coated fibers being fed into respective low friction tubes, such as a polytetrafluoroethylene (ptfe) tubes.

5. The low friction tubes, each carrying a primary coated fiber, pass through a slot in the fiber organiser unit 2, from the lower to the upper side.

6. A length of each the low friction tubes is stored in the upper side of the fiber organiser unit 2, and the free ends of the tubing are led into the top unit 3.

7. The primary coated fibers and the low friction tubes are all terminated at a connector within the top unit 3, which connector is coupled to a uniter mounted on an appropriate panel to provide an optical "socket" which is visible through, and accessible by means of, the transparent sliding cover 6.

In this way, a blown fiber cable extends into the base of the modular unit, and connection and disconnection can be made to local equipment at the top of the unit by non-experts.

In an alternative arrangement, instead of having exposed primary coated fibers carried by low friction tubes, factory "tails" might be used, each of these comprising a termination having secondary coated fiber attached. In this case, secondary coated fibers from the base unit 1 are spliced directly to the "tails", using splice protectors which are mounted in the lower part of the organiser unit 2. The "tails" then extend through to the connector in the top unit 3.

An installation procedure for installing a blown fiber cable connection to a modular unit will now be described in greater detail.

Referring to FIG. 1, the modular unit to which a blown fiber cable 5 is to be connected might already be mounted, for instance by screws holding the base unit 1, in the office environment. To install the blown fiber cable 5, the top unit 3 and the fiber organiser unit 2 are removed, exposing the open base unit 1.

Referring to FIGS. 2a, 2b, 11a and 11b, the half-height base unit 1a is generally rectangular in plan view, having two inlet slots 7 by means of which the blown fiber cable 5 can be introduced. The outer tube of the blown fiber cable 5 terminates as it enters the base unit 1a, being retained at its inlet slot 7 by a star washer 4 (see FIG. 10). In order to complete the installation as required, about 2 to 3 m of the secondary coated fiber 130 carried by the cable 5 is left exposed beyond the end of the outer tube, the end of that secondary coated fiber 130 being stripped to expose about 1 m or more of each of the four primary coated fibers, by known techniques.

Figure 2A:
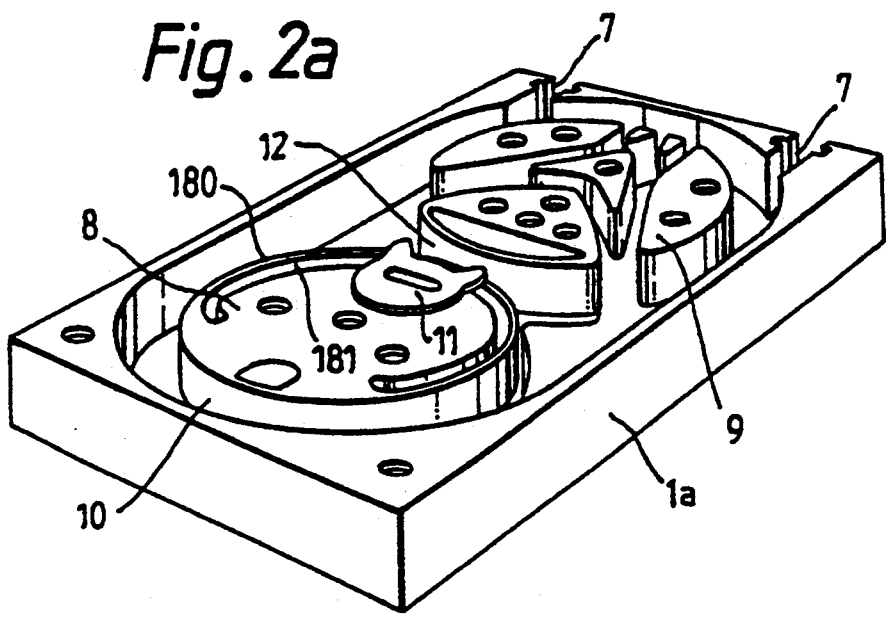
FIGS. 2a and 2b are perspective views of half height and full-height base units for use in the modular unit of FIG. 1.
Figure 2B:
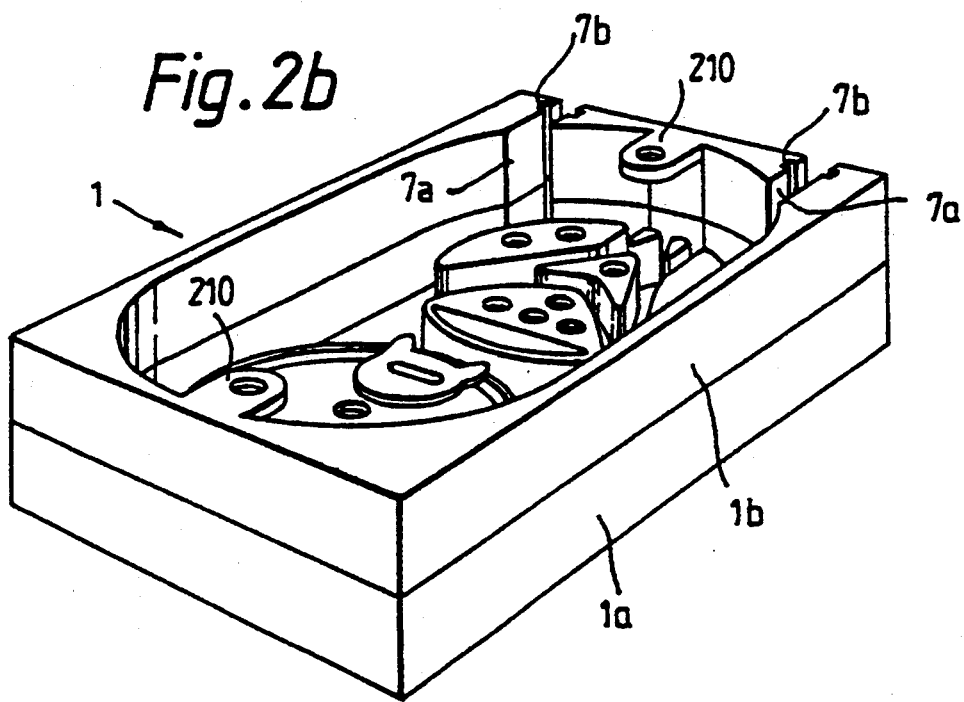
Figure 3A:
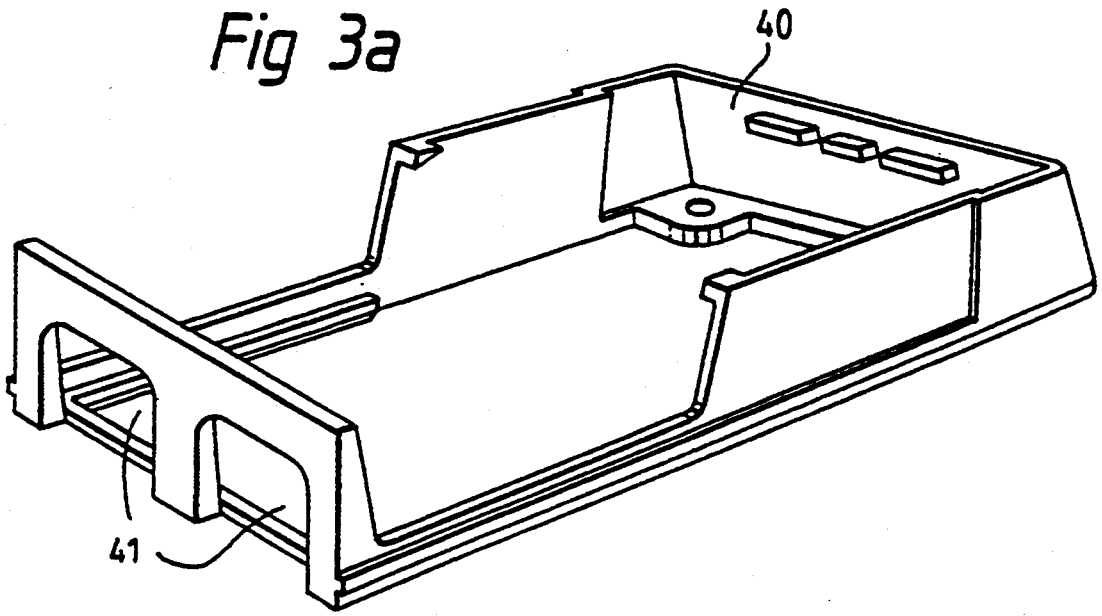
FIGS. 3a and 3b are perspective views of closed and open end top units for use in the modular unit of FIG. 1.
Figure 3B:
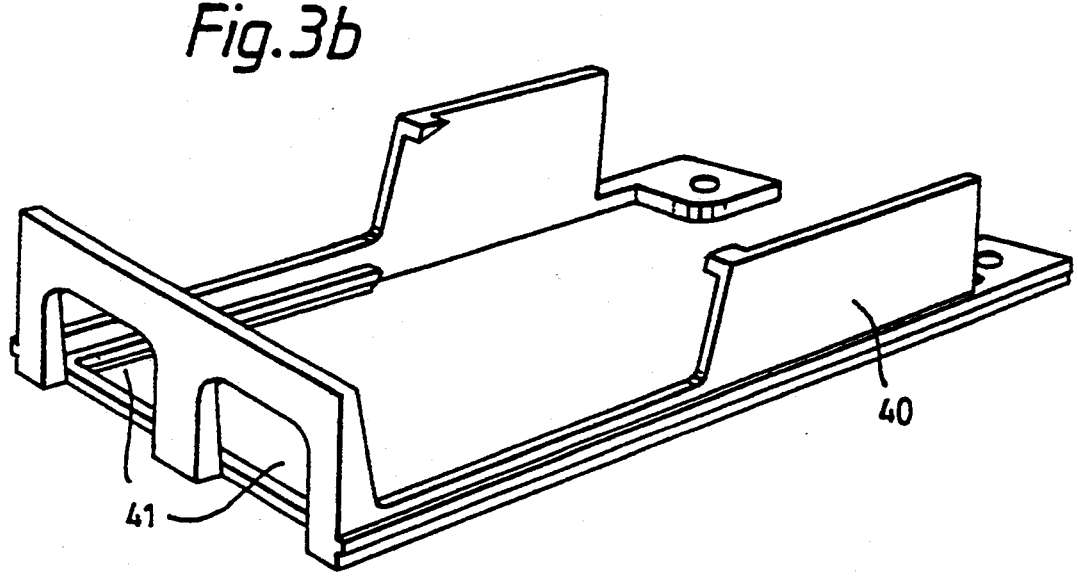
Figure 10:
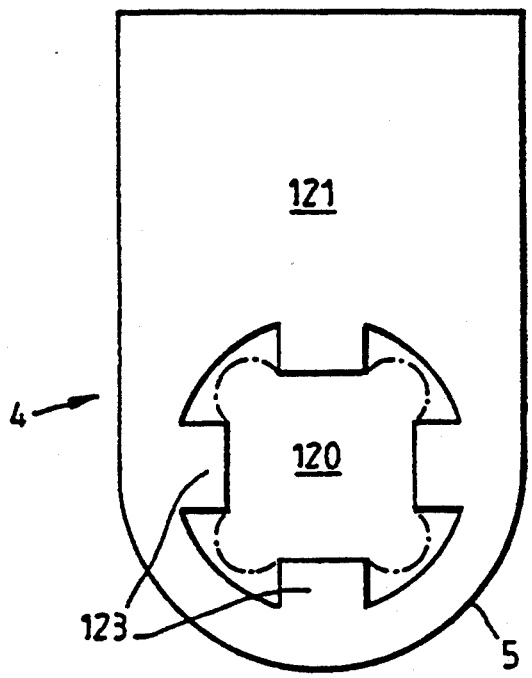
FIG. 10 is a front view of a star washer for securing part of a blown fiber cable to the base unit of FIG. 2.
Figure 11A:
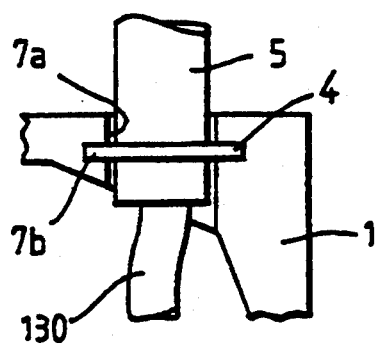
FIGS. 11a and 11b are plan and rear views respectively showing the star washer of FIG. 10 in use.

Referring to FIG. 10, the star washer 4 is fabricated from a sheet of stainless spring steel about 0.3 or 0.4 mm thick. It has a lower part with an aperture 120, and a substantially rectangular plate 121 extending upwards therefrom, in use. The aperture 120 has inwardly-projecting teeth 123. To install the end of the blown fiber cable 5 at the inlet slot 7 of the base unit 1, the star washer 4 is first mounted on the end of the cable, the washer being dimensioned such that its teeth 123 grip the outer tube of the cable firmly, this tube being somewhat resilient. As shown in FIGS. 2a, 2b and 11a, each slot 7 comprises a primary channel 7a, which accommodates the blown fiber cable 5, (including the outer tubing) and a cross slit 7b which accommodates the sides of the star washer 4. Once mounted on the end of the cable 5, the star washer 4 can be slid downwards into the cross slit 7b, taking the end of the cable with it and into position in the primary channel 7a.

Figure 11B:
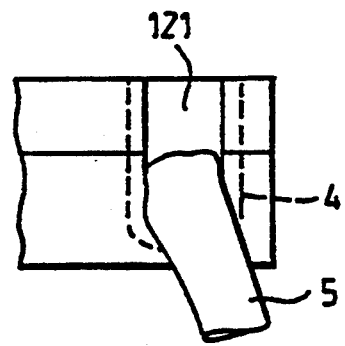

As shown in FIGS. 11a and 11b, the blown fiber cable 5 is installed at a slot 7 by use of the co-operation of the star washer 4 with the cross slit 7b. The star washer 4 has the secondary function of closing the access slot 7 once the cable 5 is install 13. To demount the cable 5 from the base unit 1, the washer 4 can simply be removed from the cross slit 7b by pulling upwards on the rectangular plate portion 121 of the washer.

Figure 14:
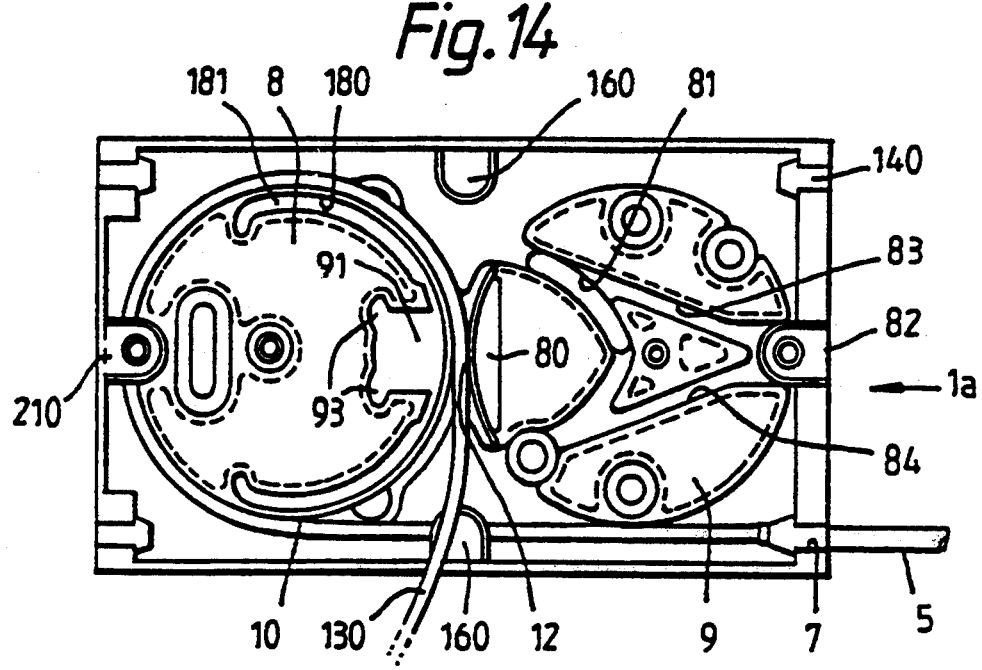
FIG. 14 is a plan view of a base unit (having an incomplete clamping arrangement) with the layout of a secondary coated fiber during installation indicated.

Referring to FIGS. 12 and 14, in an alternative arrangement, instead of the star washer 4, a plastics moulding 140 and crescent-shaped circlip 141 may be used. The circlip 141 is mounted on the end of the cable 5, and then fits into a slot in the plastics moulding 140. This has an advantage in that the plastics moulding 140 may be designed to "blank-off" unused entry holes to the base unit 1, prior to installation of the cable 5.

Referring to FIGS. 12a to 12d the plastics moulding 140 comprises a channel member 142 with a downwardly-depending circular plate 143 at one end and a pair of downwardly-depending posts 144 at the other end. The circular plate 143 is integral with the channel member 142, being attached thereto at a semi-circular groove 145. Each downwardly-depending post 144 has a slot 146 in the inwardly-directed surface thereof, the slot extending from the bottom surface of that post to part of the way up.

Figure 12A:
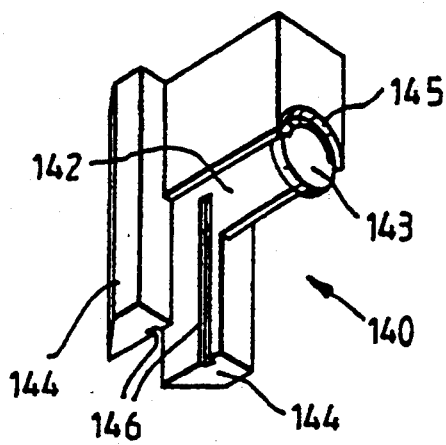
FIGS. 12a, 12b, 12c, 12d, 12e and 12g shows an alternative cable entry arrangement.
Figure 12B:
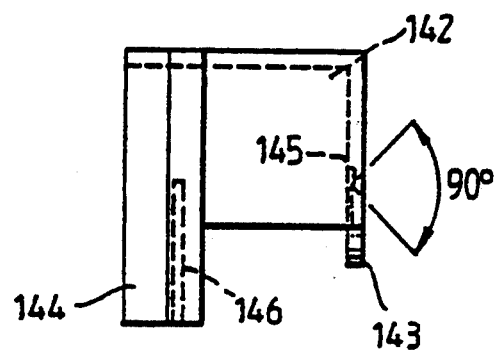
Figure 12C:
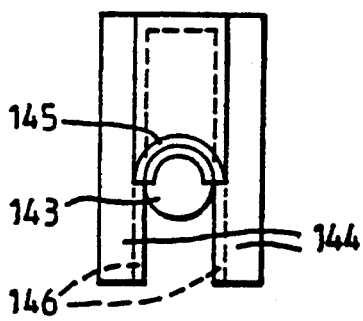
Figure 12D:
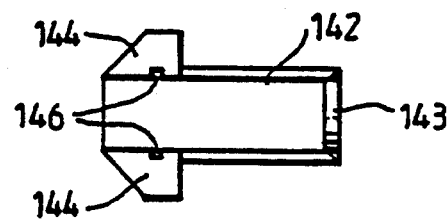

Referring to FIG. 12b, the curved groove 145 has a right-angle profile in cross-section, and has a depth only slightly less than that of the end surface of the channel member 142. To use the plastics moulding 140 to hold the end of the blown fiber cable 5 in the base unit 1, the circular plate 143 is broken or cut away at the groove 145, leaving a curved opening dimensioned to seat over the outer tube of the blown fiber cable.

Figure 12E:
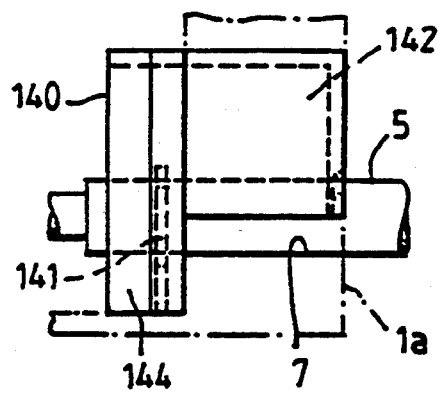
Figure 12F:
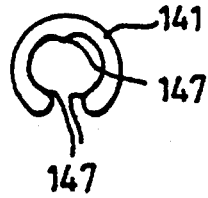

Referring to FIGS. 12e and 12f, the crescent-shaped circlip 141 is then mounted near the end of the blown fiber cable 5. The circlip 141 has inner protrusions 147 which act in the same manner as the teeth 123 of the star washer 4 and "bite" on the cable end. The cable end is then mounted, from below, into the channel member 142, the circlip 141 seating in the slot 146, and the outer tube of the cable 5 seating in the curved opening left by removal of the circular plate 143. The plastics moulding 140 can then be mounted in the slot 7, the channel member 142 actually seating in the slot 7 and the posts 144 seating against the inner surface of the base unit 1.

Figure 12G:
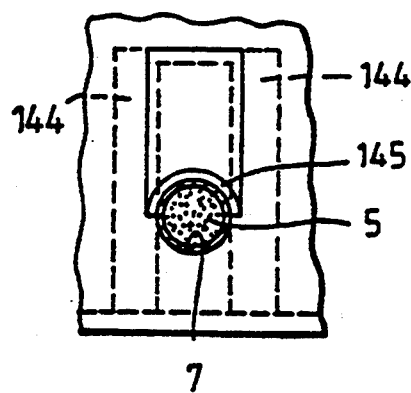

Referring to FIG. 12g, the end of the cable 5 is thus held against the curved, lower surface of the slot 7, principally by the curved opening left by removal of the circular plate 143. As a result, the slot 7 is entirely closed by the channel member 142 and the cable 5. The cable 5 effectively passes through a fitted circular aperture, the bottom half of which is defined by the bottom surface of the slot 7, and the upper half of which is defined by the opening made at the groove 14 by removal of the plate 143. Because the posts 144 seat against the inside surface of the base unit 1, pulling on the cable 5 is unlikely to pull the moulding 140 or the cable out of the slot 7 unless the moulding or the circlip 141 break.

Advantageously, as mentioned above, a plastics moulding 140 can be used to "blank off", or seal off, a slot 7 in a base unit in the absence of a cable 5. This is simply done by mounting the plastics moulding 140 in the slot 7 without removal of the circular plate 143. The circular plate 143, therefore, blocks off entry to the base unit 1 in place of the cable 5.

Referring to FIGS. 2a, 2b and 14, the secondary coated optical fiber 130 extending from the end of the blown fiber cable 5 into the base unit 1 is brought under a guide 160 and then around a first of two curved formers 8 and 9, each of which is generally circular in plan view. This first curved former 8 is provided with a resilient, high-friction covering 10, being a neoprene (or rubber) band mounted about its circumference. The outer surface of the former 8 is provided by a thin wall 180 of plastics material separated by a gap 181 from the main part of the former 8, over a substantial portion of its circumference.

At the side of this first curved former 8 which is most closely adjacent to the second curved former 9, clamping means 11 are provided (not shown in FIG. 14), this being a camming mechanism which can be rotated to push the thin wall 180 outwards and to bring the neoprene band 10 up against a bearing surface 12 on the second curved former 9. By this means, the secondary coated fiber 130 can be clamped, without damage, against axial tension which might be generated for instance by the fibers own weight in a riser bringing the blown fiber cable 5 to the modular unit.

Figure 15:
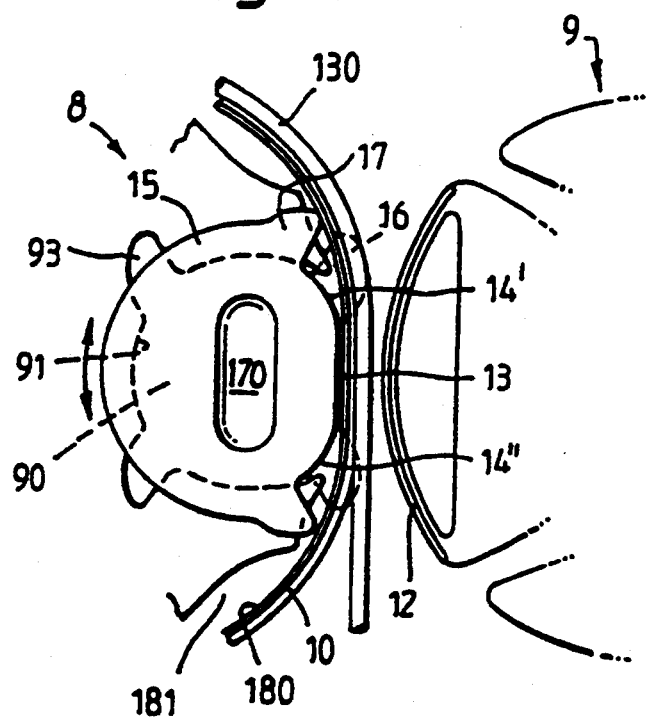
FIG. 15 shows the cam of FIG. 7 in use in a clamping arrangement.

Referring to FIGS. 7, 14 and 15 in more detail, the camming mechanism comprises a non-circular cylindrical component 90 which seats in, and can be rotated within, a substantially cylindrical cavity 91 at an edge of the first curved former 8 adjacent to the second former 9. The neoprene band 10 mounted around the first curved former 8 passes closely adjacent to the body 92 of the cylindrical component 90, between flanges (or ears) 15, 16 and 17 on the ends of the cylindrical component which protrude above, and below, the thin wall 180.

Rotation of the cylindrical component 90 in its cavity 91 has a camming action on the wall 180 and the neoprene band 10 in that it pushes the wall and the band outwards when rotated in either direction from a rest position. Referring particularly to FIGS. 7c and 15, in the rest position (shown in FIG. 15), the wall 180 lies adjacent to a very shallow convex surface of the body 92 which approximates a flat 13. When that body 92 is rotated in either direction, the shoulders of the "flat" 13 provide camming surfaces 14', 14" which act on the thin wall 180, flexing it towards the second curved former 9. The fiber 130 lying against the band 10 can then be gripped between the band and the bearing surface 12 on the second former 9, as indicated in FIG. 14.

Because the shoulders of the "flat" 13 have different radii of curvature, the amount by which the band 10 is moved outwards by rotation of the body 92 varies, depending on which direction the body 92 is rotated. This allows fibers of different thicknesses, for instance either primary or secondary coated fiber, to be clamped by the same mechanism.

As a whole, the substantially cylindrical component 90 comprises the body 92, with an incomplete flange 15 at one end, and two ears 16 at the other end. It is rotated by inserting a tool into a central slot 170. There is also provided a further pair of ears 17, formed by shaping of the ends of the incomplete flange 15 so as to flank the missing section thereof. As mentioned above, these two sets of ears 16 and 17, protrude above and below the thin wall 180, offering supporting means to the fiber 130 lying around the curved former 8, preventing it from sliding off that former 8 during loading and handling of the fiber organiser unit 2.

Referring to FIG. 15, when mounted in the base unit 1 (not shown in the figure), the incomplete flange 15, together with the two ears 16, also provide retaining means for the cylindrical component 90 in the base unit 1. The two ears 16 at the lower end of the component 90 pass through complementary enlargements 93 of the cavity 91, when the component is being first installed. Once the component 90 has been positioned in the cavity 91, it is rotated through 180° to bring it into its rest position with the "flat" 13 facing the second curved former 9. In this position, the ears 16 at the lower end of the component are retained under the margin of the cavity 91 and under the thin wall 180, holding the component 90 in place. In use, the two ears 16 also co-operate with stops (not shown) in the base unit 1 to bring the component 90 into either of two pre-determined rotational positions when turned by an operator. This allows a preselected one of the two camming surfaces 14' and 14" to be brought accurately into operation on the band 10.

Figure 7A:
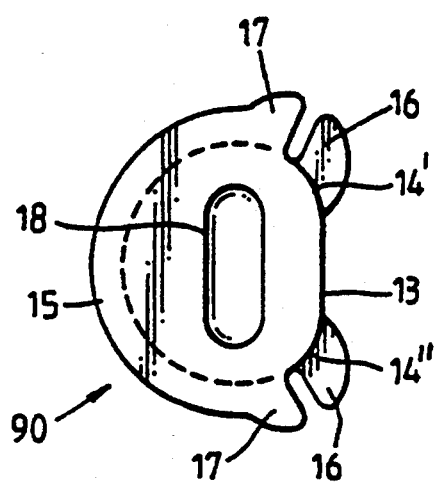
FIGS. 7a, 7b, 7c and 7d are plan, side, underneath and front views respectively of a cam for use in the base unit of FIGS. 2 and 6.
Figure 7B:
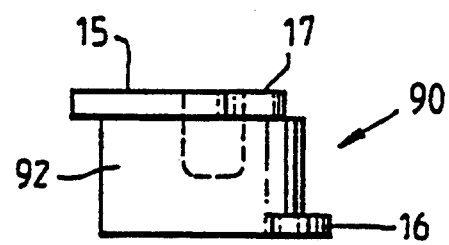
Figure 7C:
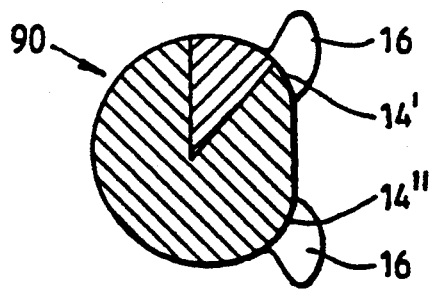
Figure 7D:
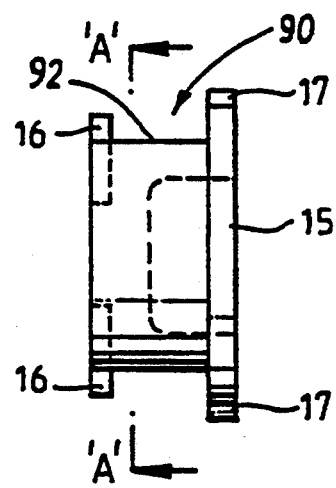

Referring to FIGS. 7a and 7c, the camming surfaces 14' and 14" are provided as follows. The cross-section of the body 92 of the cylindrical component 90 has a radius of curvature which is primarily 7.5 mm. However, two adjoining parts of that cross section have radii of curvature of 8.35 mm and 28.0 mm. The part having a radius of curvature of 28.0 mm creating the "flat" 13, =he part having a radius of curvature of 8.35 mm creating a first bearing surface 14', and the shoulder at the other end of the "flat" 13, where it reverts to the radius of curvature of 7.5 mm, creates the second bearing surface 14".

It should be noted that no part of the profile of the body 92 has a radius of curvature of less than 4 mm, even where one radius of curvature blends into a different radius of curvature. This prevents over bending of the fiber 130 clamped by means of the clamping mechanism 11 to a degree damaging to the fiber.

Referring to FIG. 14, the bearing surface 12 on the second curved former 9 provides a resilient pad against which the fiber 130 can be held. It is formed by a relatively thin, shell section of plastics material which lies over a cavity 80 in the second former 9 so that pressure on the bearing surface 12 can depress it slightly.

Referring to FIGS. 2a, 2b and 14, once clamped by the clamping mechanism 11, a length of the secondary coated fiber 130 can be stored in the full-height base unit 1, by coiling in the space above the two curved formers 8 and 9. Perhaps four or five turns of fiber might be so stored. Bosses 210, primarily for use in mounting the base unit 1 for instance as shown in FIG. 13, and the guides 160, overhang the space above the curved formers 8 and 9 and help to hold the turns of fiber in place. However, during installation, it is more convenient to have a length of the secondary coated fiber 130 loose, so that the next stage of installation, at the fiber organiser unit 2, can be carried out with less constraint.

Figure 8A:
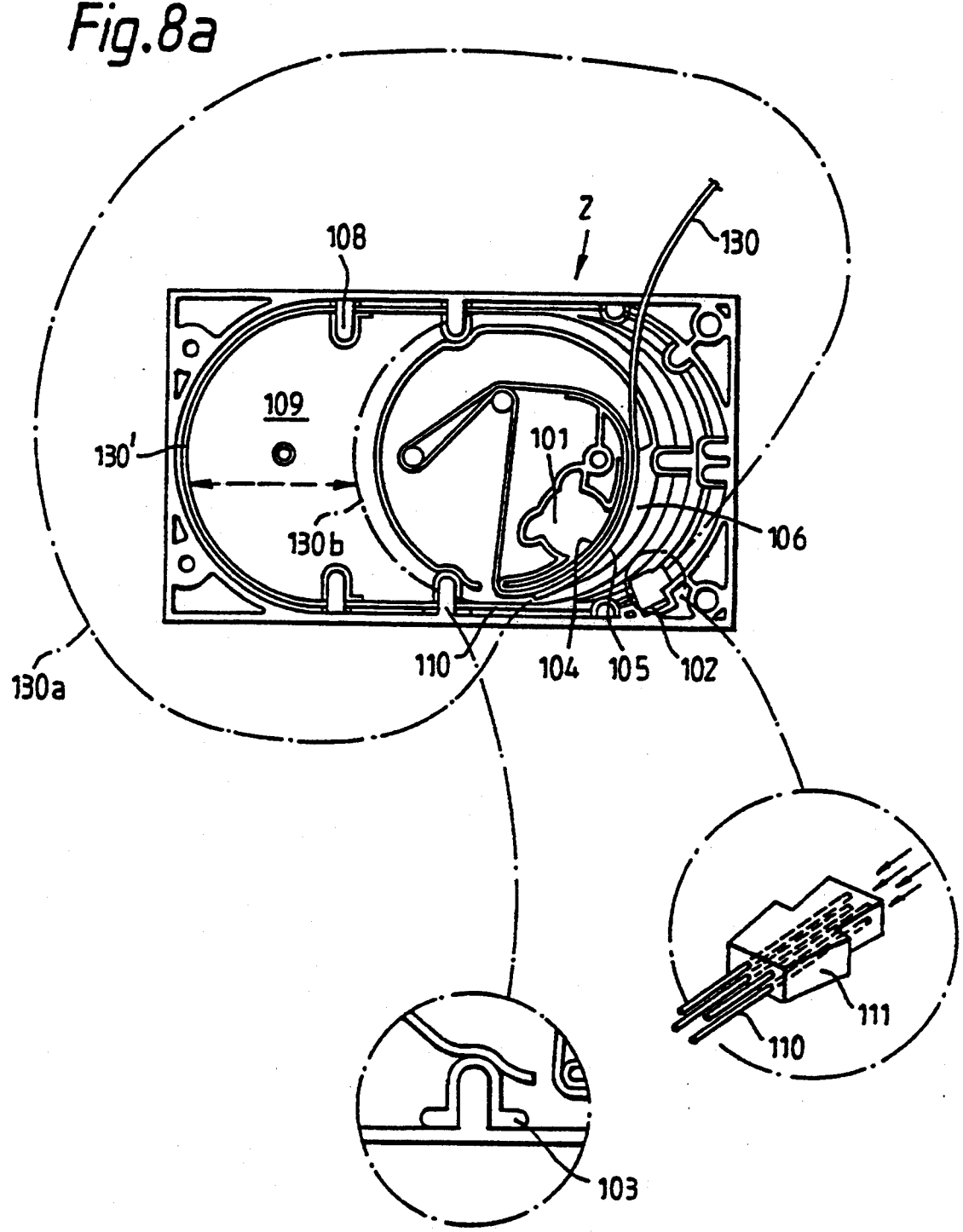
FIGS. 8a, 8b and 9 are views from below and above respectively, of a fiber organiser unit for use in the modular unit of FIG. 1, with fiber installed.

Referring to FIG. 8a, the secondary coated fiber 130 is brought from the base unit 1 to the underside of the fiber organiser unit 2, where it is again held by a clamping mechanism (not shown in full but only indicated by a cavity labelled 101) of the same type as that described above with reference to the base unit 1. The fiber 130 is clamped at the end of the secondary coating, leaving only the four primary coated fibers 130' (only one of which is shown for reasons of clarity) beyond. In this case, however, the clamping mechanism 101 is mounted facing somewhat more outwardly, so that it clamps the fiber 130 in a position towards the perimeter of the organiser unit 2.

Instead of being mounted on a first curved former, about which the fiber is wound, and operating against a second curved former, it is mounted behind a relatively short, thin, plastics wall 104 which it pushes outwards against a bearing surface 105 carried on a resilient, curved wing 105 of plastics material, the shape of the bearing surface 105 being complementary to that of the thin wall 104 against which this second clamping mechanism 101 acts. Again, the clamping mechanism 101 acts indirectly, via the thin wall 104, on a neoprene band 107, and it is this band 107 which actually grips the fiber, in use.

It will be realised that there is no necessity to be able to support significant axial tension at this point in the modular unit, and the fiber 130 does not, therefore, need to lie against any significant length of the neoprene band 107 as it does against the equivalent band 10 in the base unit 1.

Beyond the clamping point in the organiser unit 2, the secondary coating is removed to leave only the four primary coated fibers 130' exposed. (The secondary coating in this embodiment is the secondary coating normally provided in blown fiber cable and techniques are known by means of which it may be removed.)

Several loops of each primary coated fiber 130' will be stored in this lower part of the fiber organiser unit 2. However, before arranging the loops for storage, it is convenient to pass the free end of each fiber 130' into the respective capillary tube 110 which will carry it through a slot to the upper part of the organiser unit 2.

Referring to FIG. 8a and its insets, four ptfe capillary tubes 110 (only one of which is shown for reasons of clarity), are provided, one for each fiber 130'. Each tube 110 is secured by its end in a respective bore in an elastomeric block 111. The block 111 is retained in a cavity 102 in the lower side of the organiser unit 2. To feed the primary coated fibers 130' through to the upper part of the unit 2, the block 111 is lifted from its cavity 102, and the free end of each fiber 130' simply fed into one of the bores and therefore into the open end of a respective capillary tube 110. This can be done without damage to the delicate fibers 130' because of the non-frictional nature of ptfe. The block 111 is then installed in its cavity 102, the capillary tubes 110 being fed through a slot 103 to the upper part of the organiser unit 2.

At this point of installation, a length of each primary coated fiber 130' remains loose prior to storage (shown in FIG. 8a by a dotted line 130a). The flexible wall 104 and the plastics wing 106 are both part of a generally-circular former offset to an end of the organiser unit 2.

This leaves a significant space 109 towards the other end of the unit 2. Several loops of each primary coated fiber 130' can be stored in this lower pan of the unit 2 (as shown by a dotted line 130b in FIG. 8a), by installing it around the perimeter of the unit 2, taking in both the generally circular former and the far end of the space 109. Tabs 108 overhang the space 109 so as to hold the stored loops of fibers in place.

Where a different type of fiber cable is being installed, rather than the blown fiber cable described above, the alternative arrangement of FIG. 8b can be used. A common form of fiber cable has, as mentioned previously, individual fibers each having both primary and secondary coatings. In this case, the secondary coatings normally have much less thickness. Accordingly, after the outer protective tube is removed, the four secondary coated fibers are overlined with a single replacement tube 130" which is used to carry the secondary coated fibers to the clamping means 11 and the clamping mechanism 101. Also, instead of taking primary coated fibers through to the upper part of the organiser unit 2, using the capillary tubes 110, secondary coated fibers can be brought through. In this case, a respective factory tail 130c (only one shown) is spliced directly to each secondary coated fiber 130 in the lower part of the organiser tray 2. (A factory tail comprises a termination applied, in the fabrication plant, to a length of secondary coated fiber, and can simply be spliced, in the field, to a secondary coated fiber end.) Consequently, no primary coated fiber need be exposed beyond the clamping mechanism 101 or otherwise. Instead, the free fiber end of each factory tail is fed through the slot 103, from the upper to the lower part of the organiser tray 2, and spliced to the associated secondary coated fiber 130 held by the clamping mechanism 101.

Figure 8B:
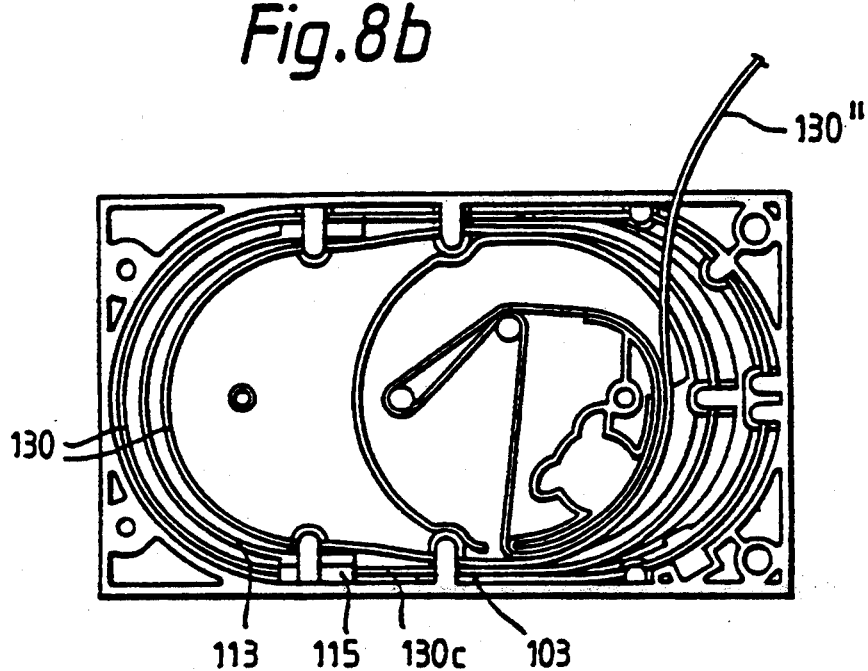

Spare loops of secondary coated fiber 130 are stored, in this case, in the lower part of the organiser unit 2, these loops being arranged substantially in the same way as that in which the loops of primary coated fiber 130' are stored in the embodiment described above with reference to FIG. 8a. In this embodiment, however, the splices, which are protected by conventional splice protectors 115, are held in place by a leaf spring device 113 whose ends are biased outwards against the outer wall of the organiser unit 2. Only one splice protector 115 is shown in FIG. 8b, but normally each fiber 130 would have a splice protector 115. Each end of the leaf spring device 113 might then hold two splice protectors in place, one above the other.

Figure 9:
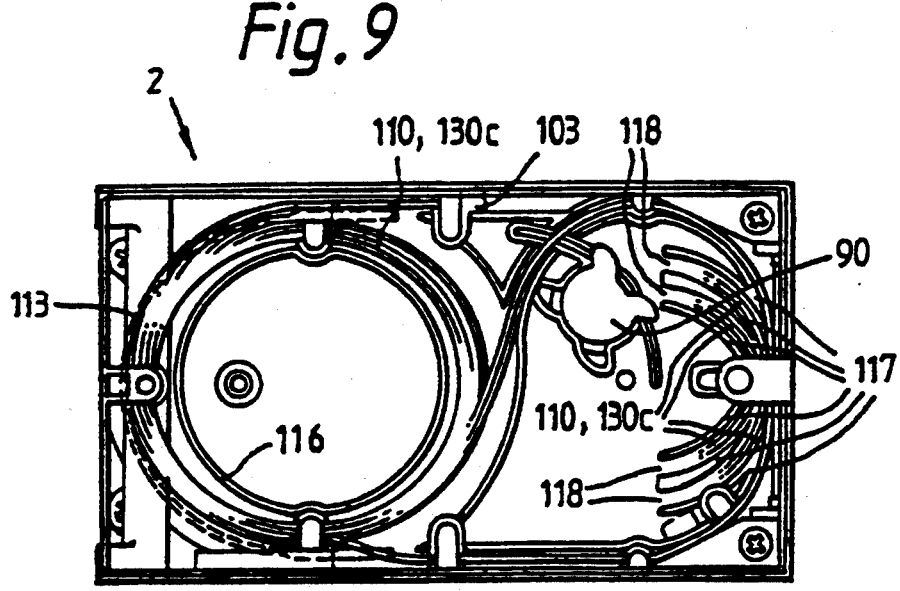

Referring to FIG. 9, having passed through the slot 103 each capillary tube 110, or each fiber tail 130c, reaches the upper part of the organiser unit 2. This is provided with a generally circular former 116 which occupies about one half of the unit 2, and with a fan-shaped guide structure 117 which lies adjacent to the other end of the unit. A full loop of each of the four tubes 110 (or the fiber tails 130c) lies around the circular former structure 116. The free end of each tube 110 (or fiber tail 130c) is then wound to the rear of the fan-shaped guide structure 117, approaching it from one side or the other so that the tubes 110 (or fiber tails 130c) are substantially symmetrically divided to approach the guide structure from opposite sides. The guide structure 117 provides four spaced curved exit channels 118 and each tube 110 (or fiber tail 130c) is brought into one of these, so as to leave the organiser unit 2 along a respective upward path predisposed to co-operate with the positioning of the terminations for fiber carried by a capillary tube 110 (or each fiber tail 130c) in the top unit 3.

It should be noted that the cylindrical component 90 is in place in FIG. 9, providing the clamping mechanism 101 in use, in contrast to FIG. 8 where only the receiving cavity for the cylindrical component 90 is shown.

Referring to FIGS. 1, 3, 4, 5 and 13, the top unit 3 comprises a frame 40, a panel 60 in which the uniter or uniters 150 may be mounted, a transparent, sliding cover 6, and a transparent lid 50. The frame 40 sits on top of the organiser tray 2 and is provided with ports 41 through which customer connections can be made to the modular unit, and with a rear section which may be closed or opened, depending on the manner in which it will be used in practice.

The panel 60 (seen in FIG. 5a) has four through holes 62, through which customer connections can be made. The panel 60 sits across the organiser unit 2, to close the end thereof which will face the customer. The holes 62 are provided in a substantially vertical section, at the upper end of which is a flange 63. The clear plastics lid 50 (see FIG. 4b) is fixedly mounted, at least partly on the flange 63, to close the upper end of the frame 40 which lies away from the main part of the panel 60. Thus, seen in plan view, a first end of the modular unit is closed across its top by the fixed clear plastics lid 50, the second end of the unit being closed by the main, horizontal part of the panel 60. These two ends are offset in a vertical direction, the gap being closed by an upstanding portion of the panel 60, the holes 62 being provided in this upstanding portion. The sliding cover 6 (see FIG. 4a) is then installed, at the same level as the fixed lid 50, so that the modular unit as a whole presents a substantially cuboidal exterior.

The last step in installing fiber from the fiber cable 5 is to bring the end of each capillary tube 110 (or fiber tail 130c) from the fan-shaped guide structure 117 on the upper part of the organiser unit 2 to the respective uniters 150 under the clear plastics lid 50 of the top unit 3. Each primary coated fiber carried by a capillary tube 110 can then be connected in conventional fashion to a termination which will be held by its respective uniter 150. Preferably, each capillary tube 110 is also secured at the termination. Where a factory tail 130c has been used, the termination will already be in place. It is then merely necessary to mount the termination in its respective uniter 150.

To install or demount a connector to office equipment, a customer slides back the plastics cover 6, passes a fiber cable, with a connector 151 at the end thereof, through one of the holes 41 of the frame 40, and mounts the connector at a uniter 150 which has been provided in one of the holes 62 of the panel 60. Therefore, the customer has no access to the stored primary or secondary coated fiber, or to the stored flexible tubing 110, all of which is concealed and protected within the body of the modular unit.

Figure 5A:
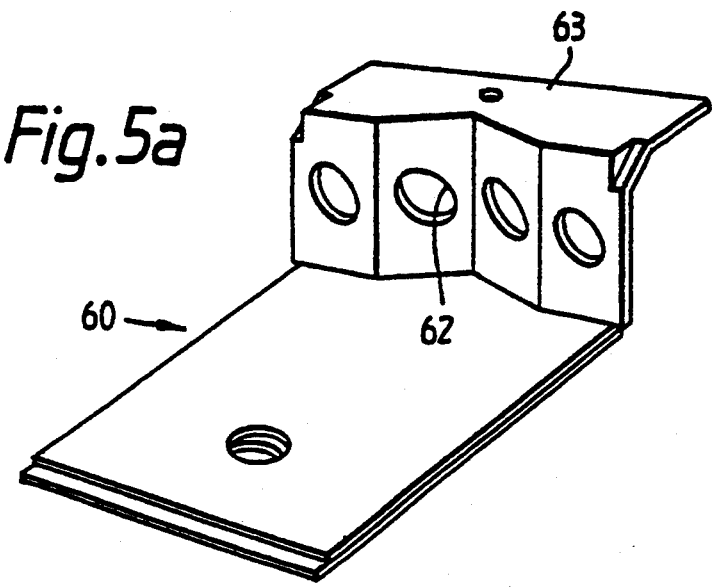
FIGS. 5a and 5b are perspective views of two alternative connector panels for use in the modular unit of FIG. 1.
Figure 5B:
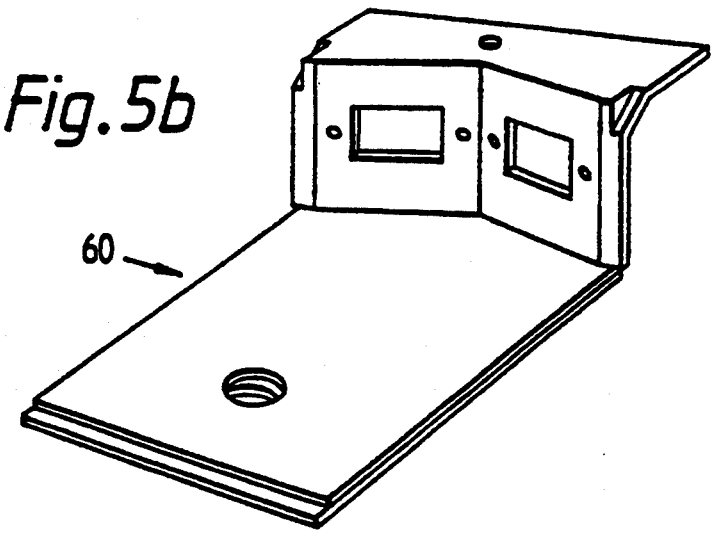

Different forms of uniter or connector might require different forms of holes 62 in the panel 60, and FIGS. 5a and 5b show alternative versions of the panel 60 to accommodate such different connectors or uniters.

Referring to FIG. 13, the modular unit can be installed in standard trunking, substantially in the same manner as a 13 amp electrical socket. In this case, the holes 41 in the frame 40 have been replaced by "L" shaped slots 41'. This allows a customer to mount a connector at a uniter, again provided in a respective one of the holes 62 of the panel 60, before installing the fiber cable attached thereto in position. Once the connector is mounted at the uniter, the fiber cable can simply be pushed downwards and along to the end of one of the "L" shaped slots 41'.

It should be noted that, in each form of the frame 40, there is a continuous (or substantially continuous) shield between the panel 60 and a user's eyes. In the arrangement shown in FIGS. 3a and 3b, this shield is provided across the tops of the holes 41. In the arrangement shown in FIG. 13, the shield is provided above the horizontal sections of the "L" shaped slots 41'. Although the shield in the arrangement shown in FIG. 13 is discontinuous, it is, most importantly, continuous at a position in line with any fiber brought up to the rear of each uniter for connection to a customer connector. This avoids a risk that the coherent radiation carried by such a fiber might cause injury to the customer if the output of the fiber is in the line of sight of the customer. Thus the "L" shape design of the slots 41' has two functions, one being the protection of the customer, and the other being to retain the fiber more positively with respect to the modular unit.

Referring to FIG. 1, the stored loops of fiber in the modular unit are used as follows:

In the base unit 1, the loops are primarily to allow separation of the fiber organiser tray 2 and the top unit 3 from the base unit 1 (which may be permanently installed in situ). The base unit 1 may not be conveniently accessible for maintenance, and so it is very useful that the organiser unit 2 and top unit 3 can be removed from the base unit 1. The loops stored in the base unit 1 will merely be uncoiled in this situation, being re-coiled at reinstallation of the organiser unit 2 and the top unit 3 on the base unit 1.

The fiber stored on the lower side of the organiser tray 2, whether primary or secondary coated, is stored primarily so that the splices, or terminations, can be broken and remade. This process uses up fiber and it is often important that a spare length of fiber should be available.

Referring to FIG. 8a, it should be noted that stored fiber can be used without changing the number of loops of fiber stored. Whether stored as primary or secondary coated fiber, the loops can be simply tightened up, shortening the straight lengths of fiber which lie between the curves at either end of the unit 2. Hence, a curve of fiber which lies in the space 109 will lie in a different position within that space when extra fiber has had to be used. This is indicated for instance by the position of the dotted line 130b which represents a curve of fiber after extra fiber has been used and one or more loops of fiber tightened. There is some considerable flexibility in this since each of several loops lying in the space 109 can be tightened so that all of the loops, instead of following the perimeter of the fiber organiser unit 2, lie closer to the generally circular former on which the clamping mechanism 101 is carried.

Where low friction capillary tubes 110 are provided to take primary coated fiber to the top unit 3, the tightening of the loops can be done simply by pulling the primary coated fibers where they emerge from the capillary tubes 110.

On the upper side of the organiser unit 2, the flexible tubes 110 can conveniently be stored in loops in case these tubes 110 need to be shortened in making or re-making connections to connectors or terminations. It may, therefore, be important that there is additional flexible tubing available. This may occur, for instance, where the end of a flexible tube 110 is attached to a connector and, instead of being demounted, is cut free in order to re-make a connection.

Some slack in a capillary tube 110 allows the associated fiber end to be inspected, and fiber end polishing to be carried out, prior to a termination being made to a fiber. However, another good reason storing either fiber 130' or capillary tubes 110 on the upper side of the organiser unit 2 is to facilitate separation of that unit from the top unit 3 for handling purposes.

The modular unit may be mounted in any of a plurality of different situations, for instance being mounted on a rack by means of a mounting system as disclosed in the specification of our co-pending British patent application number 9106659.7. This allows a convenient access to, and maintenance of, a unit in the crowded conditions of a rack system.

Alternatively, the modular unit could be modified so that it can be accommodated directly on a conduit box. Instead of using cable entry via the slots 7 of the base unit 1, fiber entry might be directly through a slot 81 in the base of the base unit 1, as shown in FIG. 6.

Still referring to FIG. 5, in another alternative fiber entry system, adaptor accessories can be mounted to the inlet slots 7 to provide access to a break-out portion 82 of the full-height base unit 1, fiber entering through the break-out portion, and then being guided to lie in either of alternative guide channels 83 and 84. These options may be incorporated in the design of the base unit 1, as shown in FIG. 6. Moreover, the base unit 1 may be made in a single moulding, rather than in the lower and upper units 1a and 1b.

It might also be possible to amalgamate the organiser and top units 2 and 3 into a single entity, particularly where factory tails are used to bring fibers to the uniters 150. In this case, the loops of fiber, the splices and the splice protectors 115 would be stored on the underside of the amalgamated unit, and the fan-shaped guide structure 117, or an equivalent, would be provided on the upper side, closely adjacent to the upstanding panel carrying the holes 62 for the uniters 150.

We claim:

1. Optical fiber connection equipment comprising a modular unit into which a protected optical fiber carrier can be brought, so that optical fibers carried thereby can be terminated for subsequent connection to optical equipment, the unit comprising:
    first, second and third separable modules, the second module being adjacent to the first module, and the third module being adjacent to the second module, the third module housing at least one optical connector at which a respective optical fiber of the carrier can be terminated,
    storage means for storing a length of optical fiber, and
    anchoring means for anchoring said optical fiber at first and second anchorage points which lie in different modules, the storage means being such that the length of optical fiber stored enables said modules to be separated by a predetermined distance without disconnection of the optical fiber at either of said anchorage points.

2. Equipment as in claim 1, wherein the modular unit has dimensions substantially the same or less than the dimensions of an electrical wall twin socket.

3. Equipment as in claim 1, wherein said first module of the unit provides access for said carrier, said carrier comprising:
    a plurality of primary coated optical fibers, a secondary coating surrounding the primary coated fibers, and an outer protective covering surrounding the secondary coating.

4. Equipment as in claim 3, wherein:

the first anchorage point is located within the first module, the second anchorage point is located in said second module of the unit, and the outer protective covering is anchored at the first anchorage point.

5. Equipment as in claim 4, wherein the outer protective coveting of the carrier is removed downstream of the first anchorage point, and a secondary coated fiber is anchored at the second anchorage point.

6. Equipment as in claim 5, further comprising a third anchorage point for the secondary coated fiber, the third anchorage point being positioned in the first module downstream of the first anchorage point.

7. Equipment as in claim 4, wherein:

the outer protective covering of the carrier is removed downstream of the first anchorage point, a tubular sheath is positioned over the optical fibers, the tubular sheath constituting a further coating for said optical fibers, and the resulting further coated fiber is anchored at the second anchorage point.

8. Equipment as in claim 7 further comprising a third anchorage point, the third anchorage point being located in the first module and being adapted to anchor the tubular sheath housing the secondary coated optical fibers.

9. Equipment as in claim 1, wherein said first module provides access for said carrier, said carrier comprising:

a plurality of optical fibers each having a primary coating and a secondary coating, and an outer protective covering surrounding the optical fibers.

10. Equipment as in claim 9, wherein the storage means is located within the first module, the storage means storing a length of secondary coated fiber downstream of the first anchorage point.

11. Equipment as in claim 9, wherein the second module comprises first and second back-to-back compartments, the second anchorage point being located in the first compartment, the first compartment being adjacent to the first module.

12. Equipment as in claim 11, wherein the first compartment of the second module is provided with further storage means for storing optical fiber.

13. Equipment as in claim 11, wherein the first module is formed in two separable parts, one of which houses the first anchorage point, and the other of which houses the storage means.

14. Equipment as in claim 11, wherein:

the secondary coating is removed downstream of the second anchorage point, and the second module is formed with aperture means through which the primary coated fibers can pass from the first compartment to the second compartment.

15. Equipment as in claim 14, further comprising:

guidance means for guiding each primary coated fiber from the first compartment to the second compartment.

16. Equipment as in claim 15, wherein the guidance means of each primary coated fiber comprises a respective flexible tube made of low friction material.

17. Equipment as in claim 16, wherein the low friction material comprises polytetrafluoroethylene.

18. Equipment as in claim 14, wherein the first compartment of the second module incorporates retaining means for retaining a splice protector.

19. Equipment as in claim 9, further comprising a third anchorage point, the third anchorage point being located in the first module and being adapted to anchor the secondary coated optical fiber.

20. Equipment as in claim 19, wherein the movable member comprises at least part of a curved winding surface which shows a significant degree of friction, the secondary coated optical fiber lying, in use, against the curved winding surface, such that friction contributes to anchoring the fiber against axial tension, the load applied to the fiber by the axial tension thus being distributed at least partially along the winding surface.

21. Equipment as in claim 19, wherein the third anchorage point comprises:

a rotatable member of non-circular cross-section mounted adjacent to a movable member, such that rotation of the rotatable member from a rest position acts on the movable member to move it outwards with respect to the rotatable member, the movable member being provided with a resilient surface and being brought into co-operation, as a result of said outward movement, with a support member to anchor secondary coated optical fiber lying between the resilient surface and the support member, in use, against axial tension.

22. Equipment as in claim 21, wherein the support member is provided with a resilient surface.

23. Equipment as in claim 1, further comprising:

additional storage means for storing a further length of optical fiber to facilitate making and remaking of a termination thereto, the additional storage means permitting optical fiber to be withdrawn therefrom without changing the number of bends in said fiber.

24. Equipment as in claim 23 wherein the additional storage means is located within a compartment of the second module, the additional storage means storing loops of fiber in such a manner that an optical connection can be made between the free end of an optical fiber of the carrier and a respective optical connector housed in the third module, and such that said optical connection can be subsequently remade following the removal of a portion of said optical fiber and the repositioning of said optical fiber so that its new free end can be connected to said optical connector without changing the number of loops of said optical fiber stored by the additional storage means.

25. Equipment as in claim 24, wherein the additional storage means stores loops of primary coated fiber, there being provided a respective low friction guidance means for guiding each primary coated fiber from the additional storage means to an optical connector.

26. Equipment as in claim 25, wherein each said guidance means comprises a flexible tube of low friction material.

27. Equipment as in claim 26, wherein the low friction material comprises polytetrafluoroethylene.

* * * * *